No. 765,873. PATENTED JULY 26, 1904.
H. BERRY.
MIRROR.
APPLICATION FILED MAY 18, 1904.
NO MODEL.
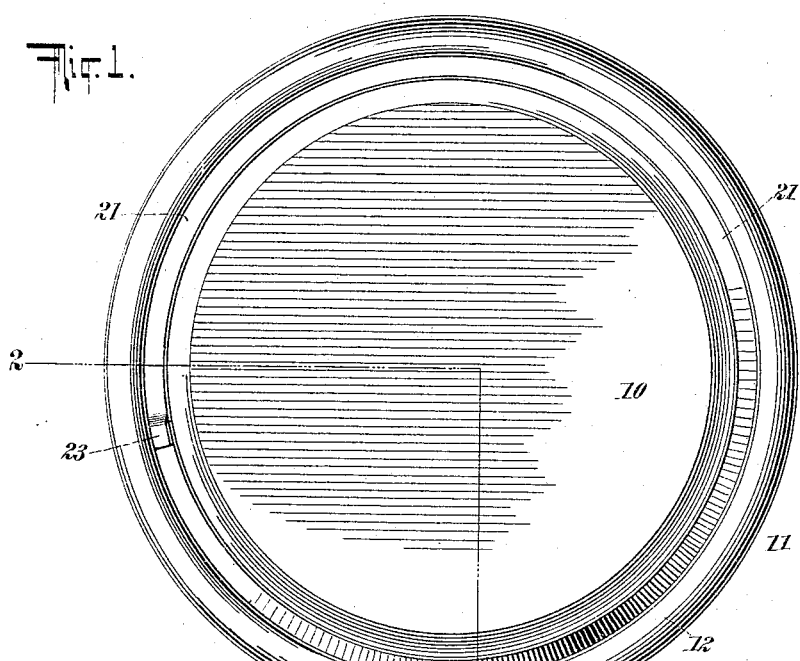
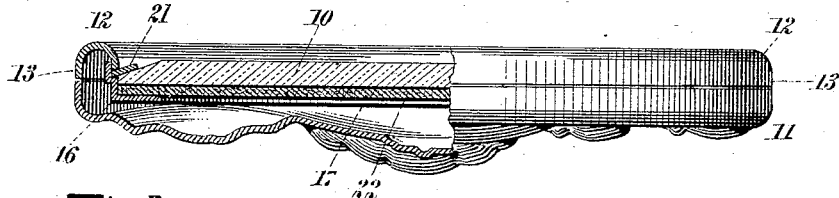
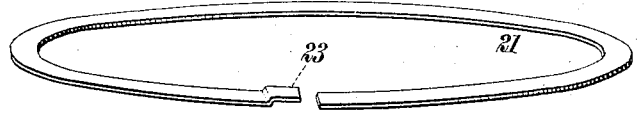
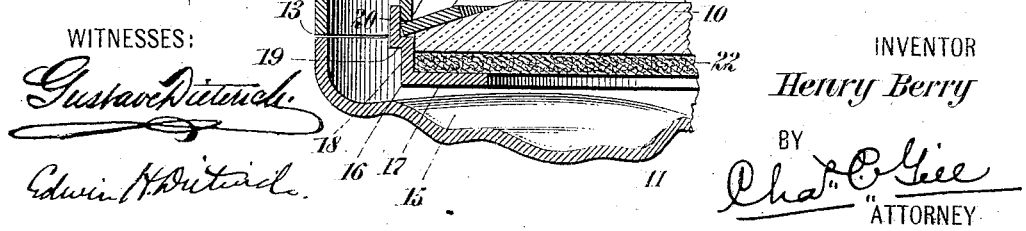
WITNESSES:
Gustave Dietrich
Edwin H. Dietrich
INVENTOR
Henry Berry
BY
Chas. C. Gill
ATTORNEY No. 765,873.

Patented July 26, 1904.

UNITED STATES PATENT OFFICE.

HENRY BERRY, OF SHELTON, CONNECTICUT, ASSIGNOR TO INTERNATIONAL SILVER COMPANY, OF MERIDEN, CONNECTICUT, A CORPORATION OF NEW JERSEY.

MIRROR.

SPECIFICATION forming part of Letters Patent No. 765,873, dated July 26, 1904.

Application filed May 18, 1904. Serial No. 208,506. (No model.)

*To all whom it may concern:*

Be it known that I, HENRY BERRY, a citizen of the United States, and a resident of Shelton, in the county of Fairfield and State of Connecticut, have invented certain new and useful Improvements in Mirrors, of which the following is a specification.

The invention relates to improvements in mirrors, and more particularly in that class of toilet-mirrors in which the glass is secured within an inclosing rim formed or provided on a back of metal or other suitable material.

The invention consists in novel means, hereinafter described, by which the mirror may be securely and efficiently supported and held within its metal back without marring the appearance of the article and without danger of injury to the ornamental design applied to or formed on said back.

My invention has reference more particularly to mirrors whose backs are of ornamental character and made of metal, and in carrying out my invention I provide means which efficiently support the glass and prevent any possibility of the mirror-back being injured by or during the application of the glass to the same, and my invention not only enables the convenient application and securing of the glass, but improves the article as a whole.

The invention will be fully understood from the detailed description hereinafter presented, reference being had to the accompanying drawings, in which—

Figure 1 is a top view of a mirror constructed in accordance with and embodying the invention. Fig. 2 is an edge elevation, partly in section, on the dotted line 2 2 of Fig. 1 of same. Fig. 3 is a detached perspective view of a split ring which coöperates with other parts in securely retaining the glass upon its support, and Fig. 4 is an enlarged sectional view of a portion of the mirror on the dotted line 2 2 of Fig. 1.

In the drawings, 10 designates the glass or mirror proper, and 11 the metal back for the same, this back being of ornamental character, as indicated, and supplemented by a rim 12, which is of inverted-U shape in cross-section and at its outer edge 13 is attached to the circumferential edges of the body of the back 11, while at its inner edge (numbered 14) the said rim extends downwardly toward the cavity 15 of the said back.

Within the cavity 15 is suspended from the inner side of the edge 14 of the rim 12 the supporting-ring 16, which conforms to the outline of the glass 10 and comprises the lower horizontal supporting-flange 17, the vertical flange 18, rising from the outer edge of said flange 17, the horizontal flange 19, which extends outwardly from the upper edge of said flange 18, and the vertical flange 20, which extends upwardly from the outer edge of said horizontal flange 19 and is attached to the inner side of the depending edge 14 of the rim 12, whereby the said supporting-ring 16 is held suspended clear of the body of the back 11 and becomes a fixed part of the general structure. The horizontal flange 19 of the ring 16 is suitably below the lower edge of the inner portion of the rim 12, as more clearly illustrated in Fig. 4, whereby between said edge and the upper surfaces of the flange 19 is formed a space to snugly receive the outer circumferential edge of the split ring 21, said edge of said ring being confined below and bearing against the inner edge of the said rim 12, as shown in Fig. 4.

In assembling the parts the ring 16 will be secured to the rim 12 and the rim 12 to the outer edges of the body of the back 11, and thereupon a disk or layer of felt or other soft cushioning material 22 will be placed upon the flange 17 of the ring 16 and the glass 10 then placed upon this disk or layer and pressed with some firmness downwardly upon the same, the outer edges of the glass 10 somewhat snugly fitting the walls of the vertical flange 18, after which and while the pressure is maintained upon the glass 10 the split ring 21 will be introduced around the outer edges of the glass 10 and intermediate the lower inner edge of the rim 12 and the upper surface of the horizontal shoulder-flange 19 of the ring 16, as illustrated in Fig. 1, this ring when in position serving to bind the glass 10 and cushion 22 upon the ring 16 and prevent the escape of the mirror from its back 11. The ring 21 will have a natural tendency to spring outwardly against the flange 20 of the ring 16, and in addition the upward force exerted by the cushion 22 and glass 10 will serve to bind the ring 21 in position intermediate the two shoulders afforded by the rim 12 and flange 19. I supply the ring 21 at one end with a lip 23 to lap over upon the other end of said ring and conceal the joint between the meeting ends of said ring.

What I claim as my invention, and desire to secure by Letters Patent, is—

1. The mirror-back having the inner depending rim, and the ring secured at its upper edge to the inner side of said rim and having the lower horizontal flange to receive the cushion and mirror, combined with the securing-ring applied upon the upper outer edge of the mirror with its outer edge below the edge of said rim; substantially as set forth.

2. The mirror-back having the inner depending rim, and the ring secured at its upper edge to the inner side of said rim and having the lower horizontal flange 17, vertical flange 18, horizontal shoulder-flange 19 and vertical flange 20, combined with the mirror supported upon said flange 17, and the securing-ring applied upon the upper outer edge of the mirror with its outer edge below the edge of said rim; substantially as set forth.

3. The mirror-back comprising a body portion and the supplemented inverted-U-shaped rim 12 attached at its outer edges thereto, and the ring secured at its upper edge to the inner side of said rim and having the lower horizontal flange to receive the cushion and mirror, combined with the securing-ring applied upon the upper outer edge of the mirror with its outer edge below the edge of said rim; substantially as set forth.

Signed at Shelton, in the county of Fairfield and State of Connecticut, this 14th day of May, A. D. 1904.

HENRY BERRY.

Witnesses:
HILDA S. HANSEN,
EDW. W. KNEEN.